United States Patent [19]
Tschirky

[11] 3,789,572
[45] Feb. 5, 1974

[54] APPARATUS FOR TEMPORARILY CLOSING CYLINDRICAL CONTAINERS

[75] Inventor: Hansjörg Tschirky, Ettingen, Switzerland

[73] Assignee: Hoffman-La Roche Inc., Nutley, N.J.

[22] Filed: June 30, 1972

[21] Appl. No.: 267,807

[52] U.S. Cl. .................. 53/381 A, 53/128, 53/319
[51] Int. Cl..... B65b 61/22, B65b 43/40, B67b 5/00
[58] Field of Search .......... 53/128, 381 A, 319, 287

[56] References Cited
UNITED STATES PATENTS

| | | | |
|---|---|---|---|
| 2,972,846 | 2/1961 | Weller et al. .................... | 53/319 X |
| 2,995,883 | 8/1961 | Aubry ............................... | 53/381 A |
| 3,538,678 | 11/1970 | Lefori .............................. | 53/319 |
| 3,564,805 | 2/1971 | Mumford ......................... | 53/381 A |

Primary Examiner—Donald R. Schran
Attorney, Agent, or Firm—Samuel L. Welt; Jon S. Saxe; R. Hain Swope

[57] ABSTRACT

A device is disclosed in which spherical closure members, for example, glass balls, are caused to pass from a reservoir via a transfer track to a position on the top of cylindrical containers being continuously or intermittently advanced on a moving conveyor. The closure members are singly removed at a point subsequent on the conveyor by being elastically grasped by a transfer track which is then actuated by driving means to become inclined away from the conveyor thus causing the closure member to roll on the track away from the cylindrical container and pass through an aperture in the track to a collection device wherefrom they may again be returned to the reservoir.

6 Claims, 6 Drawing Figures

Patented Feb. 5, 1974

Patented Feb. 5, 1974　　3,789,572
2 Sheets-Sheet 2
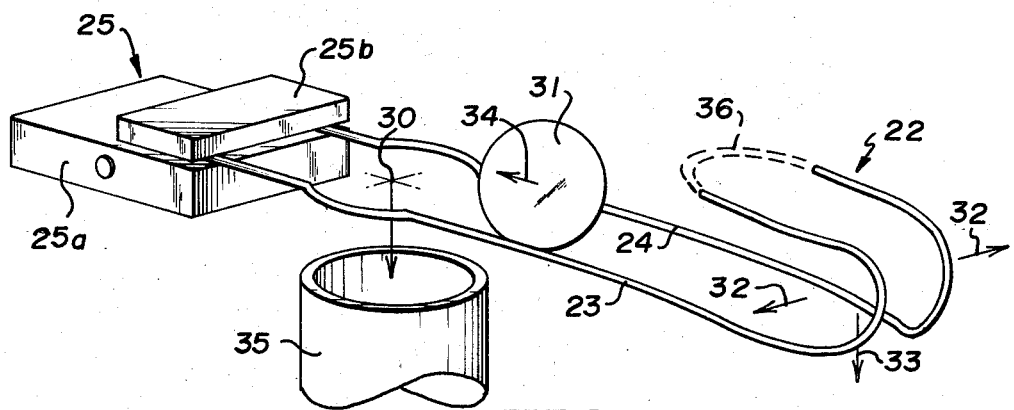
FIG. 3
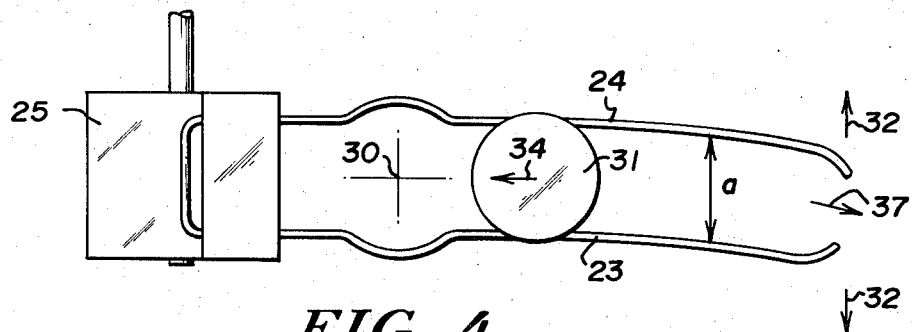
FIG. 4
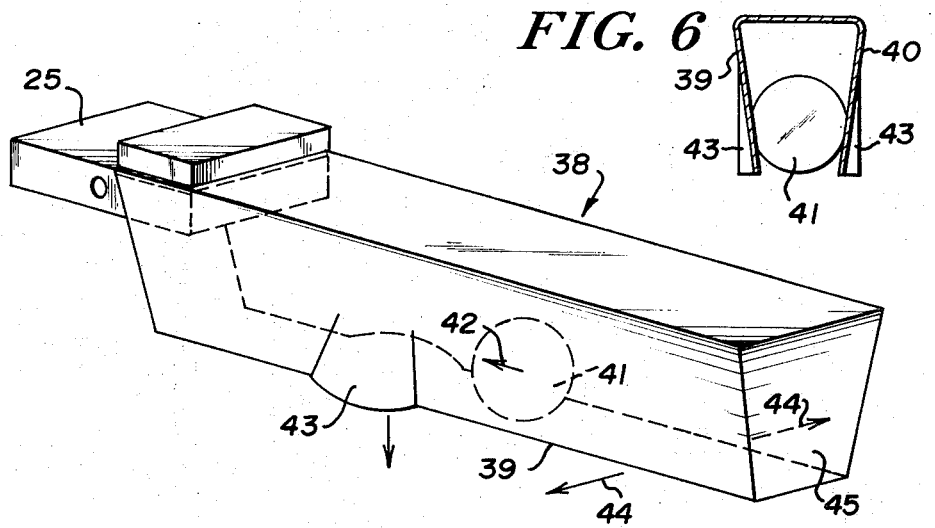
FIG. 6
FIG. 5

APPARATUS FOR TEMPORARILY CLOSING CYLINDRICAL CONTAINERS

DETAILED DESCRIPTION OF THE INVENTION

The present invention is directed to apparatus for the temporary closing and opening of cylindrical containers as they move on an endless conveyor belt by first placing a spherical closure member loosley over the opening of said containers and then removing said closure member after said containers have travelled a certain distance or after a certains period of time. The endless conveyor belt may be continuously or intermittently moving.

The apparatus of the subject invention has many practical applications in the medicinal, chemical and diagnostic fields. For example, the apparatus of the invention can be utilized in conjunction with automatic diagnostic machinery wherein reagents are added sequentially to a plurality of samples and the sample containers are then closed to permit a reaction to take place without contamination. Another instance wherein the apapratus of the present invention can be utilized to great advantage is where a series of chemical reactions are to be run in test tubes or the like and the reaction medium is heated externally or by an exothermic reaction. By utilizing the apparatus of the invention, the reaction tubes can be conveniently covered thereby preventing loss of liquid by evaporation. Glass balls are particularly suitable as closure members in this instance as they act as condensers to return the liquid to the reaction tube.

In accordance with the present invention, the above described closing and opening manipulations which hereintofore have been inconveniently accomplished manually, have been successfully automated by apparatus which may be integrated into diagnostic or chemical reaction machinery suitable for the operations described heretofore.

Although the apparatus of the present invention may be utilized with any spherical closure members recognized in the art, it is most expediciously utilized with glass balls as the closure means.

The apparatus in accordance with the invention comprises a closure member disposition assembly and a closure member removal assembly which may be cooperatively connected by suitable means known in the art for returning said closure members from the removal assembly to the disposition assembly. The closure member disposition assembly comprises a funnel-shaped reservoir for said closure members constricted at its lower region and having displaced in said constriction a conveyor disc, rotatably supported and coupled to a driving device. Said conveyor disc is provided with an arc-shaped recess at the periphery corresponding to and slightly larger than the diameter of the spherical closure members. The lower region of said reservoir is constricted so as to allow the passage of a single spherical closure member conveyed into said recess in the conveyor disc. Said conveyor disc also is provided with several indentations or projections along its periphery which prevent the interlocking or jamming of the spherical closure members just above it in the reservoir.

The conveyor disc may be driven by a motor to either reciprocate or fully rotate. In either case, the spherical closure members are conveyed thereby to a first transfer track which is inclined toward the reagent containers thereby delivering the closure members therto.

The closure member removal assembly comprises a second transfer track which is affixed to a pivotably mounted actuating member and which comprises two practically parallel members which are separated by a distance sufficiently less than the diameter of the closure members to support them and which are constructed of a material such as, for example, steel wire which is of sufficient elasticity to enable them to easily spread and pass over the closure member thus gripping it. In operation, the second transfer track retrieves a closure member from the container on the endless belt on the downstroke and ejects said closure member into a suitable collecting means on the up stroke. Preferably the transfer track members consist of substantially parallel wire bows which are shaped at the portion adjacent the conveyor into a horizontal U, the curved sections of which are slightly bent towards one another thus preventing the dropping of a spherical closure member once it is removed from the container.

Advantageously the two transfer track members form an aperture near the end affixed to the actuating member for dropping the closure means into a collecting container.

It is further within the scope of the present invention to have the collection assembly cooperatively connected to the disposition assembly so that, as the closure members are retrieved, they can be conveyed back to the reservoir thus making the operation of the apparatus continuous. Means whereby this may be accomplished are varied and are within the purview of one skilled in the art. An example of such means would be a compartmented conveyor belt disposed so as to receive the closure members from the removal assembly and release them to fall into the reservoir.

These and other objects, features and advantages of the invention will become apparent from the following description with reference to the drawing which schematically shows several embodiments of the invention and wherein FIG. 1 is a vertical cross section of the apparatus of the invention for the temporary closing of clyindrical containers;

FIG. 3 is a perspective view of the closure member removal apparatus illustrating the transfer track in mid-stroke conveying a closure member from the conveyor to the aperture and also the receiving means for said closure member;

FIG. 4 is the plan view of the apparatus of FIG. 3;

FIG. 5 is a perspective view illustrating a variant of the apparatus illustrated in FIG. 3, and;

FIG. 6 is a vertical cross section of the apparatus illustrated in FIG. 5.

Figure 1:
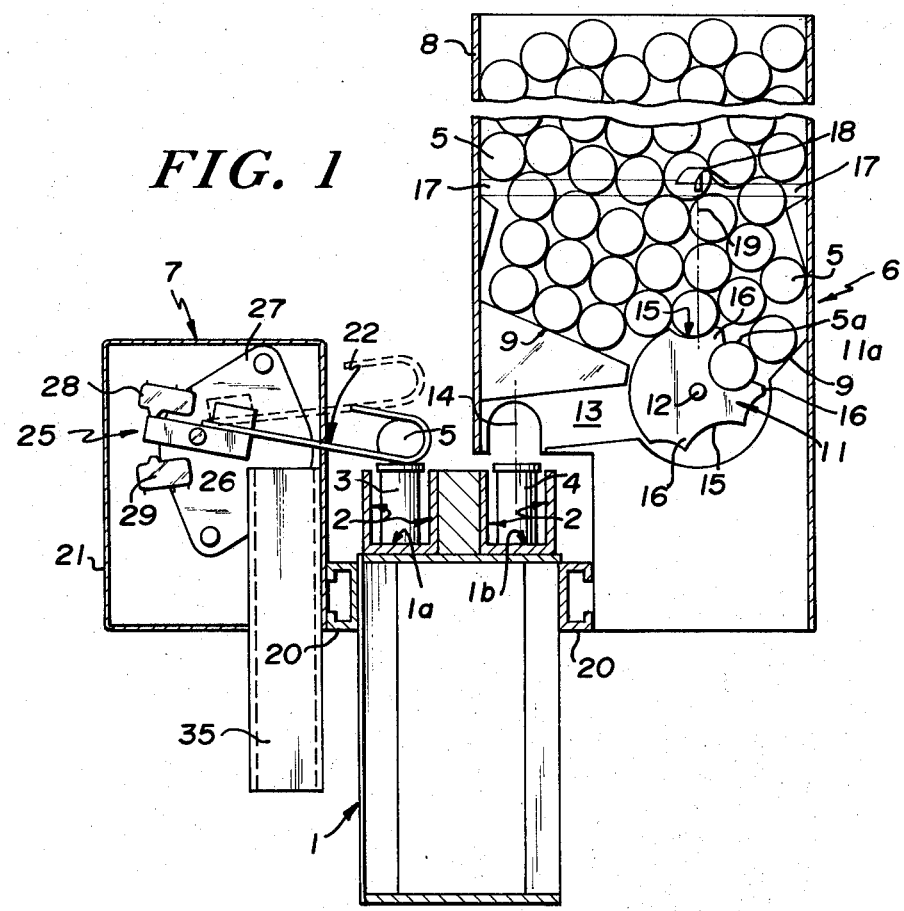
Figure 2:
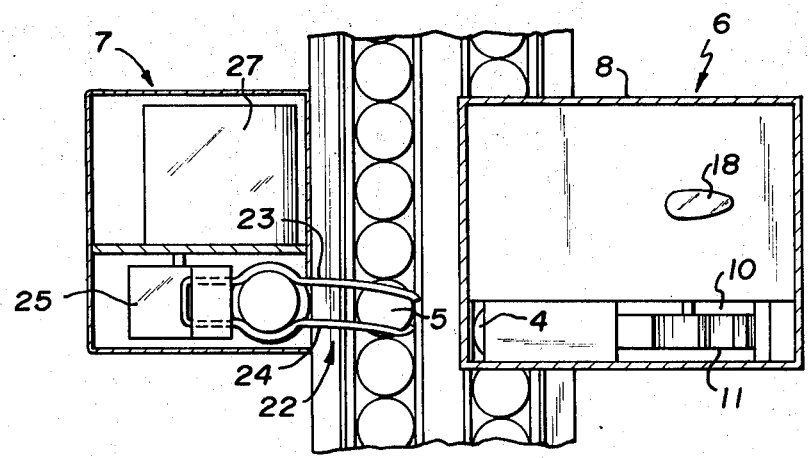
FIG. 2 is a partial plan view of the apparatus of FIG. 1.

Referring to the drawings, FIGS. 1 and 2 illustrate an endless belt conveyor arrangement denoted with 1 in its entirety which has in its upper section an endless track consisting of two parallel lines 1a and 1b. This conveyor track is bounded by vertical side walls 2 and accommodates a plurality of test tubes or cylindrical containers, 3 or 4. The cylindrical containers 3, 4 are moved forward either continuously or intermittently on the conveyor track by a driving means now shown.

The temporary closing of said cylindrical containers 3, 4 is effected by a closure member dispenser 6 and the removal of said closure members by a removal assembly 7.

The closure member dispenser 6 comprises a housing 8, the upper part of which comprises a reservoir for holding a supply of closure members 5. The base 9 of the housing 8 constricts to an approximate funnel shape leaving a gap 10 through which a conveyor disc 11 projects. The breadth of the gap 10 is slightly larger than the diameter of the closure member 5. The conveyor disc is rigidly mounted on an axis 12 and is driven in a reciprocating manner through three-fourths revolution by an electric motor not represented. The action of the conveyor disc 11 passes a closure member 5 into an inclined transfer track 13 which discharges the closure member 5 through an aperture 14 to close the cylindrical containers 4 on the conveyor track 1b. On its periphery, the conveyor disc 11 has a depression 11a in which a closure member 5a is exactly situated. Although it is preferred to have the conveyor disc rotate in a reciprocal manner, it can rotate continuously in one direction without impairment in function.

The roation of the conveyor disc 11 and the feeding movement of the cylindrical containers 4 are coordinated with each other so that each time a closure member travels down the transfer track 13 and through the aperture 14 a new cylindrical container has moved into place to receive it. This control is readily effective by means conventional in control technology which are therefore not described or represented.

The conveyor disc 11 shows at its periphery, in addition to the depression 11a a series of depressions 15 or projections 16 the distances of the external faces of which are chosen so that the reciprocating movement of the conveyor disc constantly raises or lowers the closure members situated directly above whereby an interlocking or jamming of said closure members is avoided. In order to prevent a similar jamming of said closure member in the upper region of the housing 8, a motor driven stirring rod 18 is disposed on a base 17 which executes a reciprocating motion about the vertical axis 19.

The closure member remover apparatus comprises a housing 21 in which a transfer track 22 is pivotably supported. The ends of the transfer track 22 are bent into a U at the unaffixed end adjacent to the cylindrical containers 3. The transfer track 22 is mounted on to the clamping base 25 which is rigidly fixed to an axle 26. The axle 26 is coupled to an electric motor 27 which is controlled by means of two switches 28 and 29 thereby regulating the swing of the transfer track 22. Also shown in FIG. 1 is the receptacle 35 into which the closure members 5 are deposited after being removed from the cylindrical container 3.

FIG. 2 is a partial plan view of the apparatus in FIG. 1 showing both the closure member dispenser housing 6 and the removal housing 7. Also shown is the gap 10 in the dispensing housing 6 wherein the conveyor disc 11 is situated. The transfer track 22 of the removal assembly 7 is shown to comprise two parallel wires 23 and 24. FIG. 3 and FIG. 4 illustrate the removal mechanism showing it to be a double bow 22 which is comprised of two wires 23 and 24 which are parallel with the exception of being constricted at the curve and by being mutually separated near the affixed end to form an aperture 30 wherein closure members pass into a collection tube 35 which conveys them into a suitable container (not shown). The separation of the wires 23 and 24 with the exception of the aperture 30 expediently amounts to from about 50 percent to about 80 percent of the diameter of the spherical closure members. The wires 23 and 24 are of sufficient elasticity so that when the assembly moves in the direction of the arrow 33 the wires will separate and pick up a closure member 31 which then passes along the track to the aperture 34 as it is raised by the motor assembly 27. The mounting of the assembly 22 consists of a clamping piece 25 which is comprised of brass plates 25a and 25b which are bolted together. The wires 23 and 24 are preferably formed of elastic steel wire of about 1 mm. thickness. Other elastic materials such as are known in the art can also be utilized by varying their thickness to achieve the desired results.

The plan view illustrated in FIG. 4 shows that the two wires 23 and 24 are each bent slightly inward at the front curved section thereby preventing the loss of a closure member by rolling forward in the direction of the arrow 37. The same purpose can be equally achieved by a cross piece connecting the two curved sections of the wires as illustrated by 36 in FIG. 3. The front end of the double bow 22 consisting of wires 23 and 24 is also curved slightly in the direction of movement of the conveyor track 1a/1b. In this way the closure member is not gripped and raised until the cylindrical containers are just past the removal station thereby allowing for the next treatment station to be disposed immediately subsequent to the closure member removal apparatus if desired.

FIG. 5 illustrates an alternate assembly for the closure member removal apparatus shown in FIG. 3. In FIG. 5, the double wire bow is replaced with an inverted U section 38.

The sides of U section 38 are bent slightly inward. In this way the edges of the sides of the U, 39 and 40, form the transfer track on which the spherical closure member 41 rolls in the direction of the arrow 42 with corresponding inclination of the section 38 to pass from the assembly through the aperture 43. The assembly 38 consists of an elastic material which will separate in a direction of the arrows 44 at least at the point determined for pick up of the closing member. In this embodiment, it is of particular importance that the coefficient of friction between the closure member and the material of the assembly 38 be kept as small as possible to facilitate easy passage of the closure member to the aperture 43. Where glass balls are utilized as the closure member a light metal assembly has proved very useful in this regard. In the embodiment shown in FIG. 5 the end wall 45 of the assembly prevents a closure member from rolling out of the assembly once it is gripped.

FIG. 6 shows a cross-sectional view of the assembly 38 showing the constriction of the side walls 39 and 40 so as to grip a closure member 41 and also the widening 43 on each side wall to form the aperture.

The installation and apparatus necessary for the control of the described apparatus corresponds to known construction and is within the purview of one skilled in the art. The actuation of the switch 28 (FIG. 1) causes a raising of the assembly 22 and rolling of the closure member to the aperture. With the impingement of the clamping piece 25 on the switch 29 the direction of rotation of the motor 27 reverses and the front section of the assembly 22 is again lowered for the gripping of the next closing member. The coordination of the feed velocity of the conveyor track 1a/1b. to the rhythm dispenser apparatus 6 and removal apparatus 7 can likewise be obtained by control means well known in the art.

I claim:

1. An apparatus for the closing and opening a plurality of cylindrical containers being moved continuously or intermittently on an endless conveyor by loosely placing on the opening of each container a spherical closure member and subsequently removing said spherical closure members which comprises: a first assembly comprising a housing sufficient to retain a plurality of said spherical closing members, said housing constricted at its lower portion to accommodate a rotatable conveyor disc disposed therein and coupled to driving means, said disc having an arc-shaped recess sufficient to grasp said spherical closure member, said disc being rotated by the actuation of said driving means to convey a single spherical closure member onto a transfer track having an aperture sufficient to allow the passage of said closure members therethrough to close the opening of said cylindrical containers as they pass below; and a second assembly being disposed subsequent to said first assembly and comprising a second transfer track having two parallel members affixed at one end to said assembly and inclined away from said affixed end, means at the free end of said parallel members to grasp said closure members, each such parallel member being horizontally curved outwardly from the other in the region of the affixed end to form an aperture sufficient to allow the passage of said closure members therethrough to a collection assembly.

2. An apparatus in accordance with claim 1 wherein means to prevent the interlocking of said spherical closure members in said housing is disposed in the upper region thereof, said means comprising a rod mounted to rotate horizontally within said housing and driving means connected to rotate said rod.

3. An apparatus in accordance with claim 1 wherein said conveyor disc contains in addition to said recess in its peripheral edge other depressions and projections each of which is incapable of gripping a spherical closing member.

4. An apparatus in accordance with claim 1 wherein the ends of said members of said transfer track are joined at a point subsequent to the curved portion.

5. An apparatus for the closing and opening of cylindrical containers being moved continuously or intermittently on an endless conveyor by loosely placing on the openings of each container a spherical closure member and subsequently removing said closure members which comprises: a first assembly comprising means to convey spherical closure members from a housing to an inclined transfer track whereupon they pass through an aperture to the open end of said containers; and a second assembly being disposed subsequent to said first assembly comprising a transfer track swingably mounted in a housing, said transfer track comprising two parallel members horizontally curved outward from each other in the region of the affixed end to form an aperture sufficient to allow the passage of said closure members therethrough, said track being connected to motor means whereby it is driven in a reciprocating manner through a vertical plane whereby on the downstroke the members of said track elastically separate to capture a spherical closure member from the top of a cylindrical container and on the upstroke convey said closure member along the track to a collection assembly therefor disposed just below said aperture.

6. An apparatus in accordance with claim 6 wherein said members of said transfer tracks of said second assembly are in the configuration of a horizontal U, the curved sections of which are constricted thereby preventing the passage of a spherical closing member from the unaffixed end of said tract.

* * * * *

UNITED STATES PATENT OFFICE
CERTIFICATE OF CORRECTION

Patent No. 3,789,572    Dated February 5, 1974

Inventor(s)    Hansjorg Tschirky

It is certified that error appears in the above-identified patent and that said Letters Patent are hereby corrected as shown below:

Column 6, line 34 - claim 6 "6"  should be

5

Signed and sealed this 12th day of November 1974.

(SEAL)
Attest:

McCOY M. GIBSON JR.
Attesting Officer

C. MARSHALL DANN
Commissioner of Patents